United States Patent
Setlak

(10) Patent No.: US 7,616,786 B2
(45) Date of Patent: Nov. 10, 2009

(54) FINGER BIOMETRIC SENSOR WITH SENSOR ELECTRONICS DISTRIBUTED OVER THIN FILM AND MONOCRYSTALLINE SUBSTRATES AND RELATED METHODS

(75) Inventor: Dale R. Setlak, Melbourne, FL (US)

(73) Assignee: Authentec, Inc., Melbourne, FL (US)

( * ) Notice: Subject to any disclaimer, the term of this patent is extended or adjusted under 35 U.S.C. 154(b) by 1210 days.

(21) Appl. No.: 10/950,195

(22) Filed: Sep. 24, 2004

(65) Prior Publication Data

US 2005/0110103 A1    May 26, 2005

Related U.S. Application Data

(60) Provisional application No. 60/505,659, filed on Sep. 24, 2003.

(51) Int. Cl.
*G06K 9/00* (2006.01)
(52) U.S. Cl. ........................... 382/124; 382/126
(58) Field of Classification Search ............... None
See application file for complete search history.

(56) References Cited

U.S. PATENT DOCUMENTS

| | | | |
|---|---|---|---|
| 4,466,020 A * | 8/1984 | O'Connell ............... 358/482 |
| 5,067,162 A | 11/1991 | Driscoll, Jr. et al. ......... 382/5 |
| 5,325,442 A | 6/1994 | Knapp .................... 382/4 |
| 5,351,303 A | 9/1994 | Willmore .................. 382/2 |
| 5,400,662 A * | 3/1995 | Tamori ................ 73/862.046 |
| 5,408,885 A * | 4/1995 | Araki .................... 73/708 |
| 5,689,576 A | 11/1997 | Schneider et al. .......... 382/124 |
| 5,737,439 A | 4/1998 | Lapsley et al. ............ 382/115 |
| 5,907,627 A | 5/1999 | Borza .................. 382/124 |
| 5,909,501 A | 6/1999 | Thebaud ................. 382/124 |
| 5,940,526 A | 8/1999 | Setlak et al. ............. 382/124 |
| 5,953,441 A | 9/1999 | Setlak .................. 382/124 |

(Continued)

FOREIGN PATENT DOCUMENTS

EP    0457398    11/1991

(Continued)

OTHER PUBLICATIONS

Bazen et al., *A Correlation-Based Fingerprint Verification System*, IEEE, ISBN: 90-73461-24-3, STW-2000 09 26-02:35, Nov. 30, 2000-Dec. 1, 2000, p. 205-213.

(Continued)

*Primary Examiner*—Bhavesh M Mehta
*Assistant Examiner*—Alex Liew
(74) *Attorney, Agent, or Firm*—Allen, Dyer, Doppelt, Milbrath & Gilchrist, P.A.

(57) ABSTRACT

A finger biometric sensor may include a thin film substrate, a thin film transistor (TFT) layer on the thin film substrate, and an array of electric field sensing electrodes adjacent the TFT layer for receiving a finger adjacent thereto. The TFT layer may include a plurality of TFTs defining a respective TFT amplifier stage for each electric field sensing electrode. The sensor may further include a finger excitation electrode adjacent the array of electric field sensing electrodes, and at least one integrated circuit adjacent the thin film substrate. The integrated circuit may include a monocrystalline substrate and processing circuitry adjacent the monocrystalline substrate and connected to the TFT amplifier stages.

25 Claims, 8 Drawing Sheets

U.S. PATENT DOCUMENTS

| | | | | |
|---|---|---|---|---|
| 6,118,890 | A | 9/2000 | Senior | 382/125 |
| 6,134,340 | A | 10/2000 | Hsu et al. | 382/124 |
| 6,241,288 | B1 | 6/2001 | Bergenek et al. | 283/67 |
| 6,289,114 | B1 | 9/2001 | Mainguet | 382/124 |
| 6,327,376 | B1 | 12/2001 | Harkin | 382/124 |
| 6,483,929 | B1 | 11/2002 | Murakami et al. | 382/115 |
| 6,546,122 | B1 | 4/2003 | Russo | 382/125 |
| 6,560,352 | B2 | 5/2003 | Rowe et al. | 382/115 |
| 2002/0067845 | A1 | 6/2002 | Griffis | 382/107 |
| 2002/0138768 | A1 | 9/2002 | Murakami et al. | 713/202 |
| 2003/0002719 | A1* | 1/2003 | Hamid et al. | 382/124 |
| 2003/0102874 | A1* | 6/2003 | Lane et al. | 324/662 |
| 2003/0123714 | A1 | 7/2003 | O'Gorman et al. | 382/124 |
| 2003/0126448 | A1 | 7/2003 | Russo | 713/186 |
| 2003/0169910 | A1 | 9/2003 | Reisman et al. | 382/124 |
| 2003/0179909 | A1* | 9/2003 | Wong et al. | 382/115 |

FOREIGN PATENT DOCUMENTS

| | | |
|---|---|---|
| EP | 1041356 | 10/2000 |
| EP | 1343111 | 9/2003 |

OTHER PUBLICATIONS

Kovacs-Vanja, *A Fingerprint Verification System Based on Triangular Matching and Dynamic Time Warping*, IEEE, vol. 22, No. 11, Nov. 2000, pp. 1266-1276.

Coetzee et al., *Fingerprint Recognition in Low Quality Images*, Pattern Recognition, vol. 26, No. 10, pp. 1441-1460, 1993.

Halici et al., *Fingerprint Classification through Self-Organizing Feature Maps Modified to Treat Uncertainties*, Proceedings of the IEEE, vol. 84, No. 10, pp. 1497-1512, Oct. 1996.

Cappelli et al., *Fingerprint Classification by Directional Image Partitioning*, IEEE, vol. 21, No. 5, pp. 402-421, May 1999.

Almansa et al., *Fingerprint Enhancement by Shape Adaptation of Scale-Shape Operators with Automatic Scale Selection*, IEEE, vol. 9, No. 12, pp. 2027-2042.

Hong et al., *Fingerprint Image Enhancement: Algorithm and Performance Evaluation*, IEEE, vol. 20, No. 8, pp. 777-789, Aug. 1998.

O'Gorman et al., *An Approach to Fingerprint Filter Design*, Pattern Recognition, vol. 22, No. 1, pp. 29-38, 1989.

Ratha et al., *Image Mosiacing for Rolled Fingerprint Construction*, Thomas J. Watson Research Center.

Yau et al., *On Fingerprint Template Synthesis*, Centre for Signal Processing, School for Electrical & Electronic Engineering, Nanyang Technological University.

Brown, *A Survey of Image Registration Techniques*, Department of Computer Science, Columbia University, ACM Computing Surveys, vol. 24, No. 4, Dec. 1992.

Jain et al., *Fingerprinting Mosaicking*, 2002 IEEE, pp. 4064-4067.

Maltoni et al., *Handbook of Fingerprint Recognition*, Section 2.5, Touch Versus Sweep, pp. 65-69, Springer-Verlag, New York, 2003.

"A Capacitive Fingerprint Sensor Chip Using Low-Temperature Poly-Si on a Glass Substrate and a Novel and Unique Sensing Method", Hashido et al., IEEE Journal of Solid-State Circuits, vol. 38, No. 2, Feb. 2003, pp. 274-280, XP002311236, NY, US.

"Low Temperature Polycrystalline Silicon TFT Fingerprint Sensor with Integrated Comparator Circuit", Hara et al., Solid-State Circuits Conference, 2004. ESSCIRC 2004. Proceeding of the 30th European Leuven, Belgium Sep. 21-23, 2004, Piscataway, NJ, USA, IEEE, US, Sep. 21, 2004, pp. 403-406, XP010738572, ISBN: 0-7803-8480-6.

Young, N.D. et al., "Novel Fingerprint Scanning Arrays Using Polysilicon TFT's on Glass and Polymer Substrates," IEEE Electron Devices Letters, vol. 18 No. 1, Jan. 1997, pp. 19-20.

* cited by examiner

FINGER BIOMETRIC SENSOR WITH SENSOR ELECTRONICS DISTRIBUTED OVER THIN FILM AND MONOCRYSTALLINE SUBSTRATES AND RELATED METHODS

CROSS-REFERENCE TO RELATED APPLICATIONS

This application claims the benefit of U.S. Provisional Application No. 60/505,659, filed Sep. 24, 2003, which is hereby incorporated herein in its entirety by reference.

FIELD OF THE INVENTION

The present invention relates to the field of personal identification and verification, and, more particularly, to fingerprint sensing and processing.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

In recent years it has been practical and economical to build high-quality electronic fingerprint sensing devices using radio-frequency (RF) electric fields to develop an electronic representation of the fingerprint pattern. Such devices have been fabricated as standard CMOS integrated circuits on monocrystalline silicon substrates. These processes allow the electronic structures necessary to read the signal from each of the sensor's pixels or sensing electrodes to be fabricated directly beneath the pixels. Locating the signal conditioning electronics or sense amps under pixel was important to adequate performance of the circuitry.

One such RF fingerprint sensing device is disclosed in U.S. Pat. No. 5,940,526 to Setlak et al. and assigned to the assignee of the present invention. The patent discloses an integrated circuit fingerprint sensor including an array of RF sensing electrodes to provide an accurate image of the fingerprint friction ridges and valleys. More particularly, the RF sensing permits imaging of live tissue just below the surface of the skin to reduce spoofing, for example. The entire contents of the Setlak et al. patent are incorporated herein by reference.

Another example of a fingerprint sensing device is disclosed in U.S. Pat. No. 5,325,442 to Knapp. The fingerprint sensing device has a row/column array of sense elements which are coupled to a drive circuit and a sense circuit by sets of row and column conductors, respectively. The sense elements are actively addressable by the drive circuit. Each sense element includes a sense electrode and a switching device, such as a thin film transistor (TFT) switching device, for active addressing of that sense electrode. The sense electrodes are covered by an insulating material and are for receiving a finger. Capacitances resulting from individual finger surface portions in combination with sense electrodes are sensed by the sense circuit by applying a potential to the sense electrodes and measuring charging characteristics.

Historically, electronic integrated circuits generally achieve reduced fabrication costs by using fabrication processes with smaller electronic device geometries. With smaller device geometries the circuit itself becomes smaller, requiring less silicon, and thus costs less to fabricate. Electronic fingerprint sensors, however, generally cannot be made smaller than the area of the finger skin that needs to be imaged. Smaller component geometries do not reduce the fingerprint sensor die size or cost significantly. The only result of smaller component geometries is unused silicon space under the sensor pixels.

One approach to reducing the cost of fingerprint sensing is to design systems that can work effectively using images of smaller areas of skin. This approach has been used in a variety of devices. A second approach is to use sliding sensors. With sliding sensors, either the finger or the sensor move during the data acquisition process, which allows a small sensor to generate images of larger pieces of skin. Yet, the sliding sensors may be subject to significant image distortion, and/or they may provide an inconvenient user paradigm.

SUMMARY OF THE INVENTION

In view of the foregoing background, it is therefore an object of the present invention to provide a finger biometric sensor which provides desired sensing characteristics yet without the need for a relatively large semiconductor substrate underlying the sensing electrodes or pixels.

This and other objects, features, and advantages in accordance with the present invention are provided by a finger biometric sensor which may include a thin film substrate, a thin film transistor (TFT) layer on the thin film substrate, and an array of electric field sensing electrodes adjacent the TFT layer for receiving a finger adjacent thereto. The TFT layer may include a plurality of TFTs defining a respective TFT amplifier stage for each electric field sensing electrode. The sensor may further include a finger excitation electrode for applying an electric field to the finger, and at least one integrated circuit adjacent the thin film substrate. The at least one integrated circuit may include a monocrystalline substrate and processing circuitry adjacent the monocrystalline substrate and connected to the TFT amplifier stages. As such, the thin film substrate provides a relatively low-cost alternative to producing electrode arrays on a moncrystalline substrate, for example.

More particularly, the TFT layer may further include a plurality of TFT switching circuits each connected between the output of a respective TFT amplifier stage and the processing circuitry. Moreover, the at least one integrated circuit may further include an addressing circuit adjacent the monocrystalline substrate for selectively operating the TFT switching circuits. The addressing circuit may selectively operate the TFT switching elements to provide at least one of time domain multiplexing and frequency domain multiplexing. Further, the TFT switching elements may be arranged in rows and columns, and the addressing circuit may sequentially operate at least one of rows and columns of the TFT switching circuits.

Each TFT amplifier stage may include a differential TFT pair, and the at least one integrated circuit may further include a plurality of gain amplifier stages adjacent the monocrystalline substrate each connected between a respective TFT amplifier stage and the processing circuitry. In addition, each gain amplifier stage may be connected in a feedback loop to its respective TFT amplifier stage.

The at least one integrated circuit may further include an excitation drive amplifier adjacent the monocrystalline substrate for driving the finger excitation electrode with an alternating current (AC) signal. Additionally, the at least one integrated circuit may also include an addressing circuit for selectively operating the TFT amplifier stages. The processing circuitry may include a demodulator for demodulating signals from the TFT amplifier stages, and an analog-to-digital converter (ADC) downstream from the demodulator.

The fingerprint sensor may further include a respective shield electrode associated with each of the electric field sensing electrodes for shielding each electric field sensing electrode from adjacent field sensing electrodes. Also, each TFT amplifier stage may drive the shield electrode for its respective electric field sensing electrode. The array of electric filed sensing electrodes may generate finger biometric data based upon a stationary finger placement or a sliding finger placement.

A method aspect of the invention is for making a finger biometric sensor and may include forming a TFT layer on a thin film substrate, and forming an array of electric field sensing electrodes adjacent the TFT layer for receiving a finger adjacent thereto. The TFT layer may include a plurality of TFTs defining a respective TFT amplifier stage for each electric field sensing electrode. The method may further include forming a finger excitation electrode adjacent the array of electric field sensing electrodes, and positioning at least one integrated circuit adjacent the thin film substrate. The at least one integrated circuit may include a monocrystalline substrate and processing circuitry adjacent the monocrystalline substrate. In addition, the method may further include connecting the processing circuitry to the TFT amplifier stages.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used to indicate similar elements in alternate embodiments.

Generally speaking, the present invention is directed to an approach for designing finger biometric sensors in which relatively low cost platen structures are used to partition the requisite circuitry across several different substrates. That is, a relatively low cost platen die is used for the finger sensing structures and related circuitry, and a standard monocrystalline semiconductor die is used for the high performance electronic components. The circuitry that is preferably located off the thin film substrate, i.e., on the high performance silicon, etc., may provide some or all of the following functions: high gain-bandwidth amplification; adjustable signal gain and offset; demodulation and filtering; analog-to-digital conversion; excitation signal generation and synchronization; digital buffering, processing, and communications; and clocking, timing, and control signals.

The performance of electronic circuitry fabricated on low cost substrates is typically poor compared to the performance achievable on monocrystalline semiconductor (e.g., Si) substrates. It is therefore desirable to minimize the amount of performance-critical circuitry placed on the low cost platen substrate, and instead implement these functions on the monocrystalline silicon die when possible. Conversely, non-critical circuitry may be cheaper to fabricate on the low cost substrate than on the monocrystalline silicon, provided that adequate performance can be achieved. The balance of these two factors, coupled with interconnect issues and other systemic considerations, produces the most cost efficient sensor.

Figure 1:
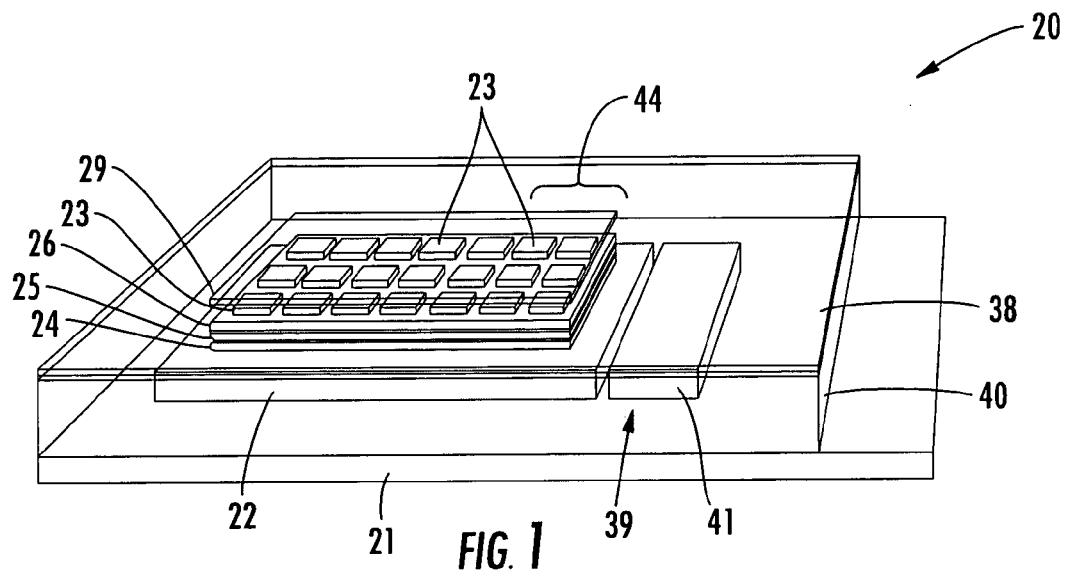
FIG. 1 is a perspective view of a finger biometric sensor in accordance with the present invention.
Figure 2:
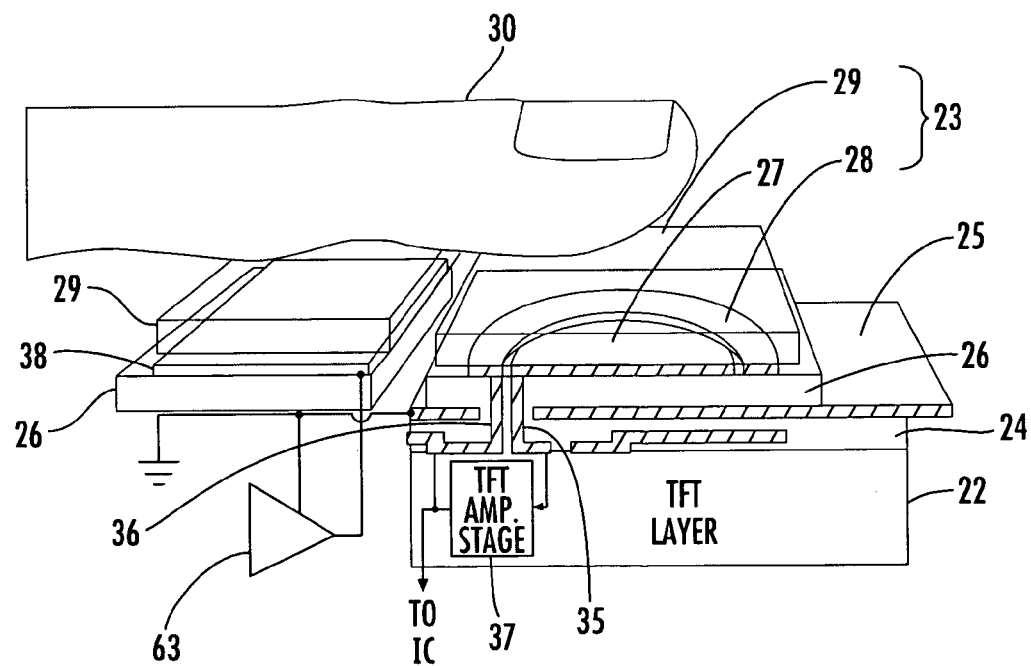
FIG. 2 is schematic cross-sectional view of an electric field sensing electrode of the finger biometric sensor of FIG. 1.

With the foregoing design consideration in mind, reference is now made to FIGS. 1 and 2, in which a finger biometric sensor 20 in accordance with the present invention is first described. The sensor 20 is capable of generating high quality fingerprint images using low cost thin film semiconductor fabrication methods. The sensor 20 uses radio frequency (RF) electric field imaging methods to acquire high quality fingerprint images.

The finger biometric sensor 20 is therefore a low-cost, high-quality sensor that uses electronic circuits which are adapted to operate within the limitations of thin film semiconductor devices. Moreover, the thin film semiconductor technology may be combined with other low cost fabrication methods to achieve the complex pixel structures needed for high performance imaging, as will be discussed further below. Further, a thin film platen (i.e., finger sensing area) structure with a small geometry is combined with a monocrystalline silicon integrated circuit to achieve the desired system performance.

The a finger biometric sensor 20 illustratively includes a thin film substrate 21 with a thin film transistor (TFT) semiconductor layer 22 on the thin film substrate. The platen includes a first dielectric layer 24 overlaying the TFT layer 22, a ground plane 25 overlaying the first dielectric layer, and a second dielectric layer 26 overlaying the ground plane.

An array of sensor pixel structures 23 are formed on the second dielectric layer 26 each including an electric field sensing electrode 27 on the second dielectric layer 26. In the embodiment illustrated in FIG. 2, the sensing electrodes 27 or plates are generally round, and each sensing electrode may optionally have a respective ring-shaped shield electrode 28 associated therewith for shielding each electric field sensing electrode from adjacent field sensing electrodes. Other shapes may be used for the sensing electrodes 27 and shield electrodes 28 as well. In the illustrated embodiment, the sensing electrodes generate finger biometric data based upon a stationary placement of the finger 30. However, in other embodiments, a smaller array 44 including one or more rows of pixels may be used to provide a sliding finger biometric sensor which generates finger biometric data based upon a sliding finger placement, as will be appreciated by those skilled in the art.

The pixel structures 23 also include a third dielectric layer 29 overlaying the sensing electrodes 27 and shield electrodes 28. The third dielectric layer 29 is for receiving the portion of the finger 30 to be sensed or read by the sensing electrode 28. It should be noted that the finger 30 is not drawn to scale in FIG. 3, but is included in the drawing to provide a frame of reference for the platen and pixel structures 23. Further details on such platens and pixel structures are provided in the above-noted U.S. Pat. No. 5,940,526, and in U.S. Pat. No. 5,963,679, which is hereby incorporated herein by reference in its entirety.

The TFT layer 22 includes a plurality of TFTs (see FIG. 6) defining respective TFT amplifier stages 37 for each electric field sensing electrode. The sensor electrodes 27 are connected to respective TFT amplifier stages 37 by vias 35 which extend through the first and second dielectric layers 24, 26. In addition, each TFT amplifier stage 37 drives the shield electrode 28 for its respective electric field sensing electrode 27 by way of a via 36, as shown.

The ground layer 25, second dielectric layer 26, sensing electrodes 27 and shield electrodes 28 may be fabricated using relatively low cost, low precision pattern deposition methods as compared to the conductive interconnects which connect the TFT amplifier stages 37 with the vias 35, 36. In this regard, the fingerprint sensor pixels 23 can be seen as similar to the display pixels used in active matrix LCD displays, as will be appreciated by those skilled in the art.

The finger biometric sensor 20 may further include a finger excitation electrode 38 for applying an electric field to the finger 30. In the illustrated embodiment, the finger excitation electrode is adjacent the array of electric field sensing electrodes 27, though it need not be in all embodiments. The sensor 20 also illustratively includes one or more integrated circuits (ICs) 39 adjacent the thin film substrate. A protective overmolding 40 may be formed over the thin film substrate 22, pixel structures 23, and the IC 39 to provide protection therefor, as will be appreciated by those skilled in the art.

Generally speaking, the signals from the sensing electrodes 27 are first processed by the TFT amplifier stages 37 to provide desired impedance matching, and are then further processed by the processing circuitry of the IC 39. Impedance conversion is typically needed since most pixel transducers are high impedance structures that are incapable of driving the array busses directly. The lower impedance signal may also be used to drive the guard shields 28 around the sensing electrodes 27. The guard shields 28 reduce inter-pixel crosstalk, enhancing the effective resolution of the sensor.

The IC 39 may be a CMOS application specific integrated circuit (ASIC), for example, fabricated using standard CMOS processing techniques, although other suitable ICs may also be used. The IC 39 includes a monocrystalline semiconductor substrate 41 (e.g., Si, Ge) and processing circuitry adjacent the monocrystalline substrate and connected to the TFT amplifier stages.

Figure 3:
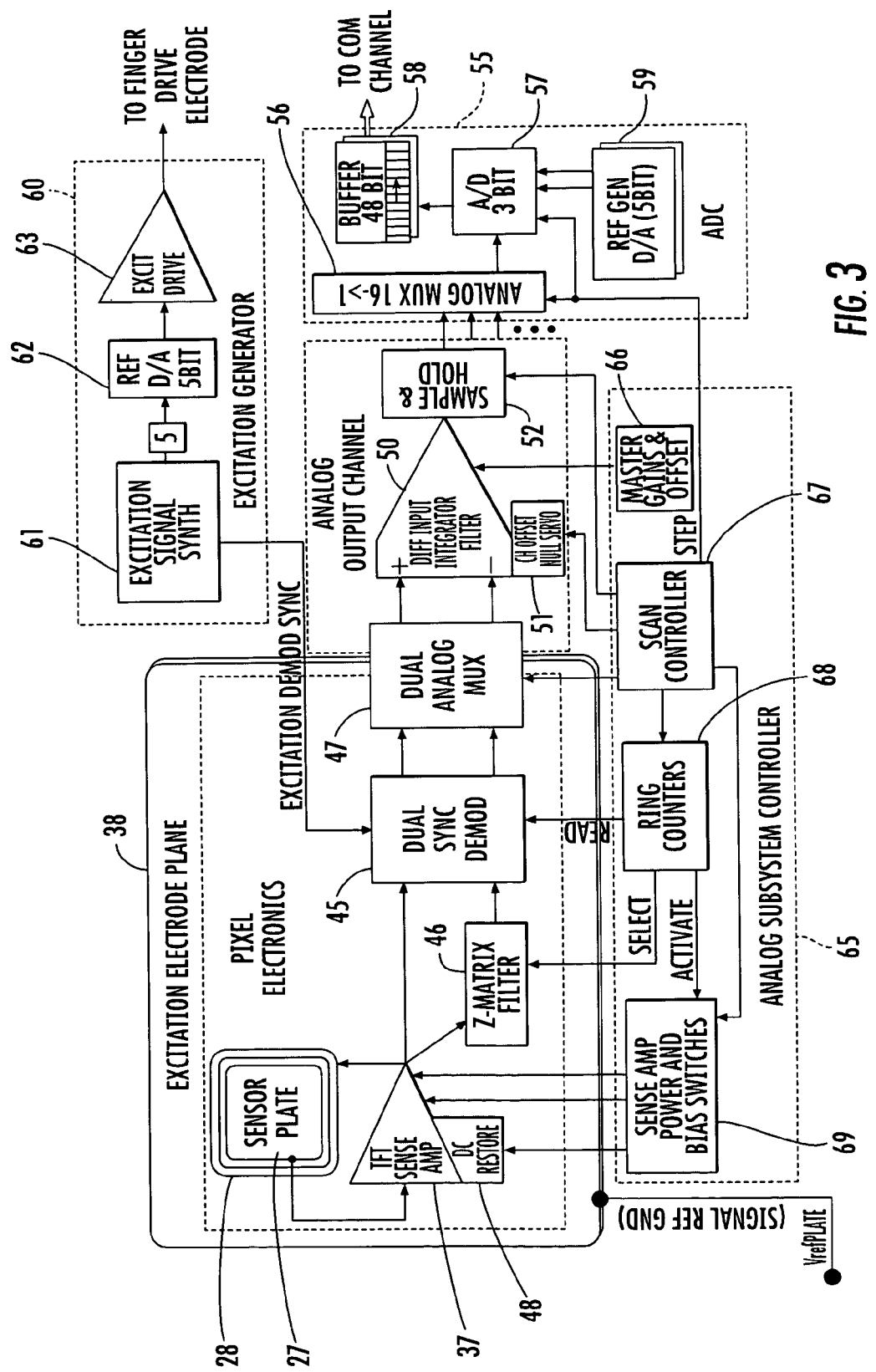
FIG. 3 is a schematic block diagram of the finger biometric sensor of FIG. 1.

Turning now additionally to FIG. 3, the processing circuitry of the IC 39 generally includes certain pixel specific electronics, analog output channel electronics, and analog-to-digital converter (ADC) electronics. More particularly, the pixel specific electronics illustratively include a respective dual synchronization demodulator 45 for each TFT amplifier stage 37, which has a first input connected to the output of its respective TFT amplifier stage. A respective z-matrix filter 46 is also connected at its input to the output of each TFT amplifier stage 37, and the output of the z-matrix filter is connected to a second input of the demodulator 45. The pixel electronics further include a respective dual analog multiplexer 47 associated with each demodulator 45, and the multiplexer has dual inputs for receiving the dual outputs of the demodulator.

The dual outputs of the various multiplexers 47 are provided to the analog output channel electronics, which illustratively include a differential input integrator/filter 50 having inverting and non-inverting inputs connected to the dual outputs of the multiplexers. A channel offset null servo circuit 51 is associated with the differential input integrator/filter 50, and the output of the integrator/filter is provided to a sample and hold circuit 52.

An ADC section 55 is downstream from the analog output channel electronics and illustratively includes a 16:1 analog multiplexer 56 receiving the output of the sample and hold circuit 52. Of course, other size multiplexers may also be used. An ADC circuit 57 (e.g., 3 bits) converts the output from the analog multiplexer 56 to digital bits, which are buffered by a buffer 58 prior to being communicated over a communications channel, signal line, etc. The ADC circuit 57 is controlled by a reference signal generator 59 (e.g., 5 bits).

The integrated circuit 39 further includes an excitation generator 60 for driving the finger excitation electrode 38. The excitation circuit illustratively includes an excitation signal synthesizer 61 which provides a multi-bit (e.g., five) output to a reference digital-to-analog (D/A) converter 62 (e.g., five bits). The analog output from the D/A converter 62 is input to an excitation drive amplifier 63, which drives the finger excitation electrode 38 with an alternating current (AC) signal to provide RF electric field fingerprint sensing, as will be appreciated by those skilled in the art. The use a conductive top surface of the package surrounding the array to carry the excitation signal and couple that signal capacitively into the finger is further described in U.S. Pat. No. 5,862,248, which is hereby incorporated herein in its entirety by reference. The excitation signal synthesizer 61 also provides an excitation demodulation synchronization signal to the dual synchronization demodulators 45.

The integrated circuit 39 also illustratively includes an analog subsystem controller 65, which optionally includes a master gain and offset circuit 66 which is connected to the integrator/filter 50. The analog subsystem controller 65 further includes a scan controller 67 which is connected to the analog multiplexer 56, the sample and hold circuit 52, the channel offset null servo circuit 51, and the dual analog multiplexers 47. The controller 65 further illustratively includes one or more addressing circuits, such as the ring counters 68, for selectively operating the TFT amplifier stages, as will be discussed further below, and sense amplifier power and bias switches 69. Both the ring counters 68 and the sense amplifier power and bias switches 69 receive an output from the scan controller 67.

The ring counters 68 provide feed output signals to the dual synchronization demodulators 45, select output signals to the z-matrix filters 46, and an activate output signal to the sense amplifier power and bias switches 69. The sense amplifier power and bias switches 69 are connected to the TFT amplifier stages 37 and respective DC restore circuits 48 as shown for selectively switching the TFT amplifier stages on and off so that inputs from different sensing electrodes 27 can be selectively or sequentially read.

As noted above, since the platen is the large size-constrained portion of the sensor 20, it is desirable to produce it using the lowest cost processes and materials possible. Some potential low cost semiconductor fabrication techniques include classic silicon methods (e.g., deposition, diffusion, photo etch processing, etc.), screen-printing and stenciling methods, ink jet printing methods, etc. Materials used with these methods may include monocrystalline silicon, polysilicon, silicon on glass, organic and plastic semiconductors on plastic or composite substrates, etc. Other low cost fabrication techniques continue to evolve that can be used to fabricate sensors designed in the fashion described herein, as will be appreciated by those skilled in the art.

It should be noted that low cost fabrication processes and substrate materials often generate low quality transistors. This may result in low gain, a low gain/bandwidth product, higher than desired leakage currents when turned off, higher than desired resistance when turned on, and larger than desired device-to-device variations across the die and between dies. Accordingly, appropriate design adjustments may be required in certain applications to account for these drawbacks, as will be appreciated by those skilled in the art.

Rather than selectively turning the TFT amplifier stages 37 on and off to read different sensing electrodes 27, a multiplexing switching array may be used along with a small set of array busses to convey signals from all of the sensing electrodes 27 to the processing circuitry of the IC 39. Various forms of multiplexing can be used, including direct addressing, time domain switching, frequency domain modulation, code modulation, etc.

Figure 4:
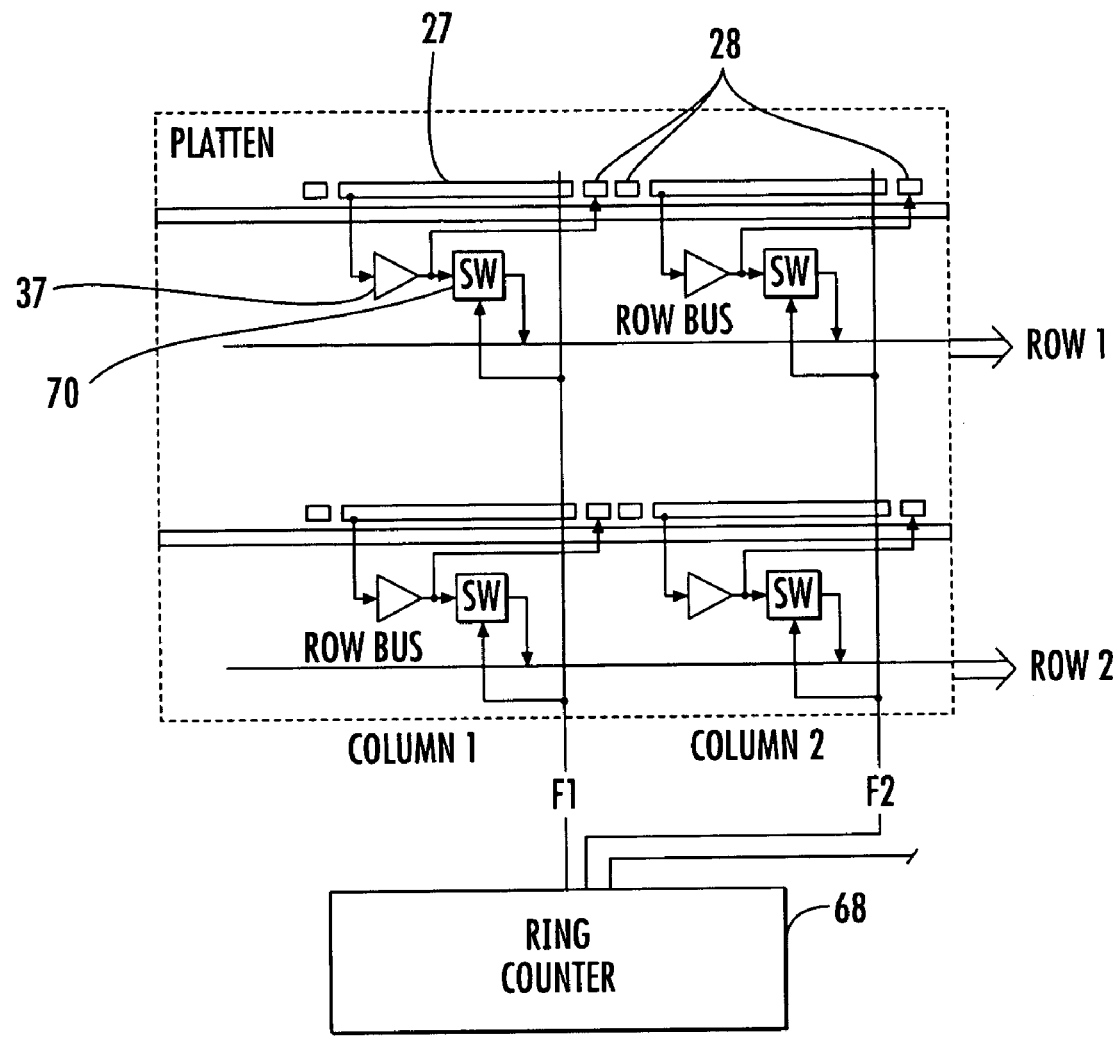
FIG. 4 is schematic block diagram of the thin film transistor (TFT) electronics associated with the electric field sensing electrodes of the finger biometric sensor of FIG. 1.

Referring to FIG. 4, a time domain multiplexing embodiment for a simplified two-row, two-column sensor is now described. A respective TFT switching element 70 is connected to the output of each TFT amplifier stage 37. The TFT switching elements 70 are connected to the ring counter 68, which opens and closes the TFT switching elements one column (or row, if desired) at a time so that all of the sensing electrode 27 outputs for a given column are read at once. A sequence of amplitude modulated signals representing each sensing electrode 27 of the given row is therefore output to the processing circuitry via respective row busses, one sensing electrode at a time. While schematically shown in FIG. 4, it should be noted that the rows are in actuality side-by-side with the sensing electrodes 27 being coplanar, as will be appreciated by those skilled in the art.

Figure 5:
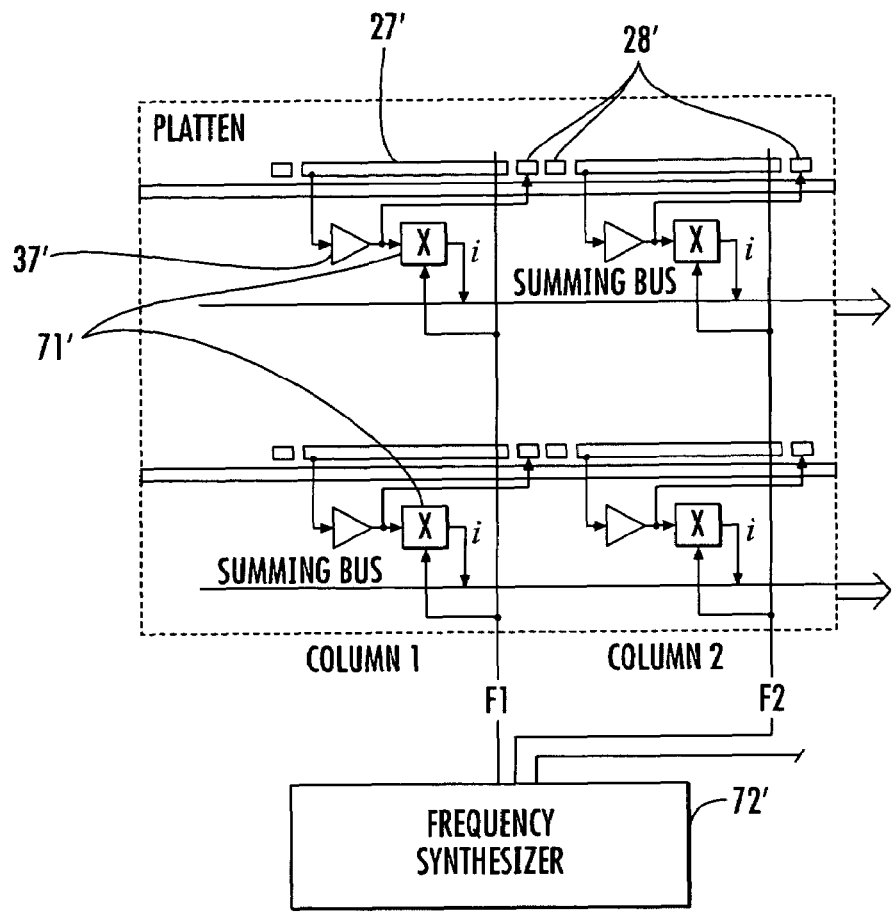
FIG. 5 is a schematic block diagram of an alternate embodiment of the TFT electronics associated with the electric field sensing electrodes of the finger biometric sensor of FIG. 1.

Turning now additionally to FIG. 5, a frequency domain multiplexing embodiment is now described. In this embodiment, non-linear circuit elements receive as inputs the output of a respective TFT amplifier stage 37, and a signal from a different type of address circuit, namely a frequency synthesizer 72'. The signals from the frequency synthesizer 72' each have a respective one of a plurality of different frequencies F1, F2, etc., associated therewith. The non-linear circuit elements 71' generate an output signal component proportional to the product of the two input signals. Thus, the row busses become summing busses, on which the sum of the amplitude modulated signal from each sensing electrode 27 in the row at different frequencies is summed. That is, the signals form all of the sensing electrodes of a given row may be present simultaneously, and the summed signals may advantageously be decoded using known frequency demodulation techniques, as will be appreciated by those skilled in the art.

Figure 6:
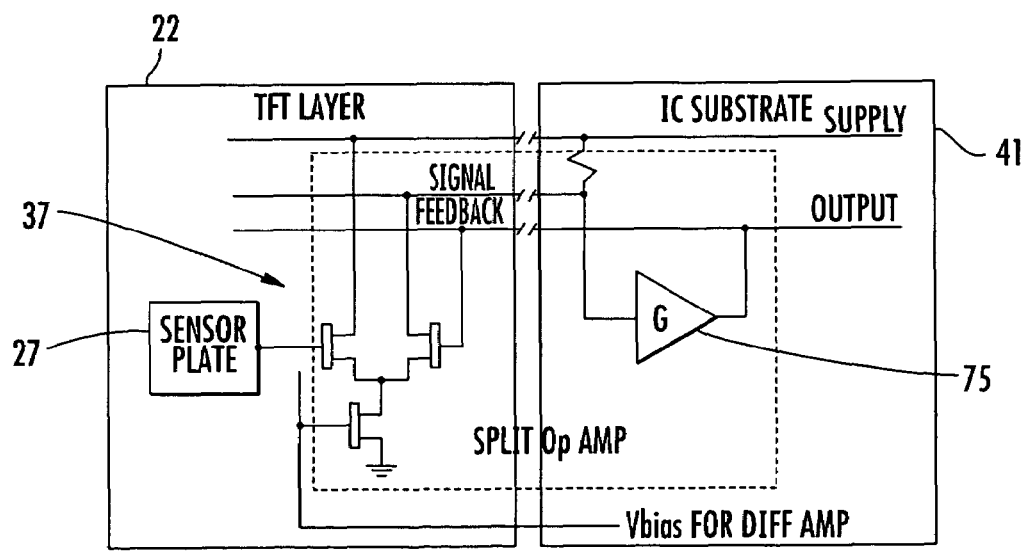
FIGS. 6-10 are schematic block diagrams of embodiments of the finger biometric sensor of FIG. 1 including a split operational amplifier configuration.

Referring additionally to FIG. 6, in some low cost semiconductor processes, it is possible to fabricate a reasonably balanced differential transistor pair, which may function as the TFT amplifier stage 37. Such a differential pair may be used as the front end or first stage of an operational amplifier, while a second gain stage 75 of the operational amplifier may be included in the IC 39. In other words, in such a "split" operational amplifier design, the operational amplifier is divided across two (or more) substrates. That is, the first differential amplifier stage 37 is fabricated under the sensing electrode 37 on the relatively low cost thin film substrate 22 to provide the desired impedance conversion and switching functions. The subsequent stage (or stages) 75 of the operational amplifier is fabricated on the monocrystalline substrate of the IC 39.

The gain stage 75 provides high open loop gain with sufficient bandwidth so that a high level of negative feedback can be routed back to the first amplifier stage 37. The feedback can be used to compensate for variations and weaknesses in the performance of the components on the low cost substrate, yielding overall circuit performance and pixel-to-pixel consistency significantly better than can typically be achieved on the low cost substrate alone, or when the front-end amplifier stages are not strongly coupled to higher performance back-end stages.

Figure 7:
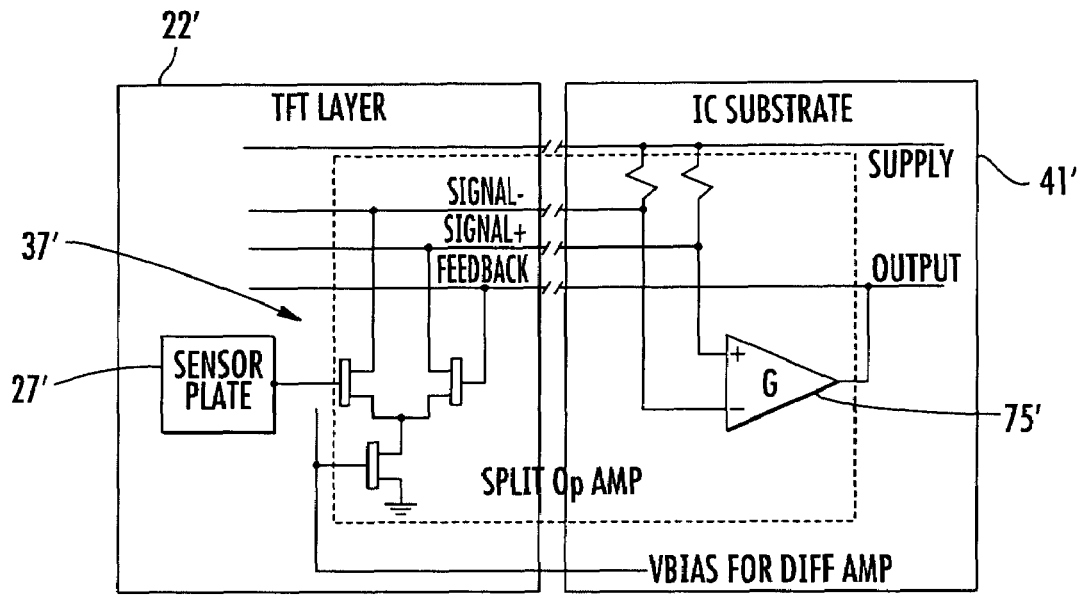

Various circuit configurations may be used for the first TFT amplifier stage 37, depending on the specific strengths and weaknesses of that particular process being used. For example, many variations of the split operational amplifier concept can be implemented to help mitigate specific weaknesses in various classes of low cost platen fabrication processes. A split operational amplifier using a single ended signal line crossing the substrate boundary is illustrated in FIG. 6. Improved performance may be achieved in some embodiments if desired using a differential signal path across the substrate boundary, as illustrated in FIG. 7. This concept can also be extended to use differential structures for both the signal paths and the feedback paths, as will be appreciated by those skilled in the art.

Figure 8:
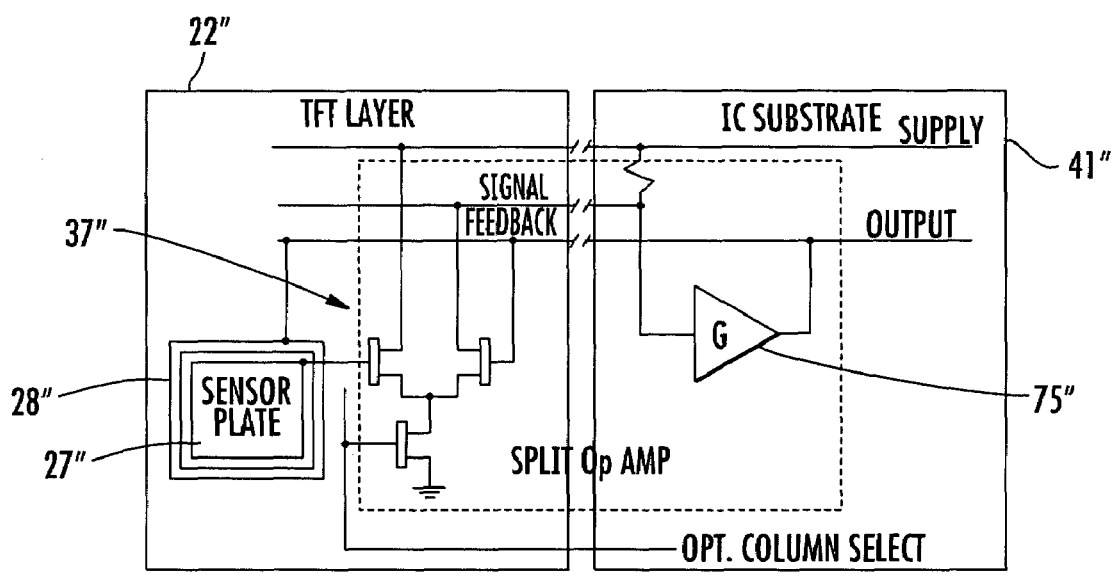

As noted above, some classes of sensing elements 27 benefit from the use of shield electrodes 28 between the sensing electrodes. One split operational amplifier approach which may be used for the shield electrodes 28" using the low impedance feedback signal developed by the high-performance silicon amplifier gain stage 75" is illustrated in FIG. 8. If the overall operational amplifier is configured for unity closed loop gain, the feedback signal will closely track the sensor 27" signal and provide the low impedance decoupling signal needed by the shield electrode 28", as will be appreciated by those skilled in the art.

Figure 9:
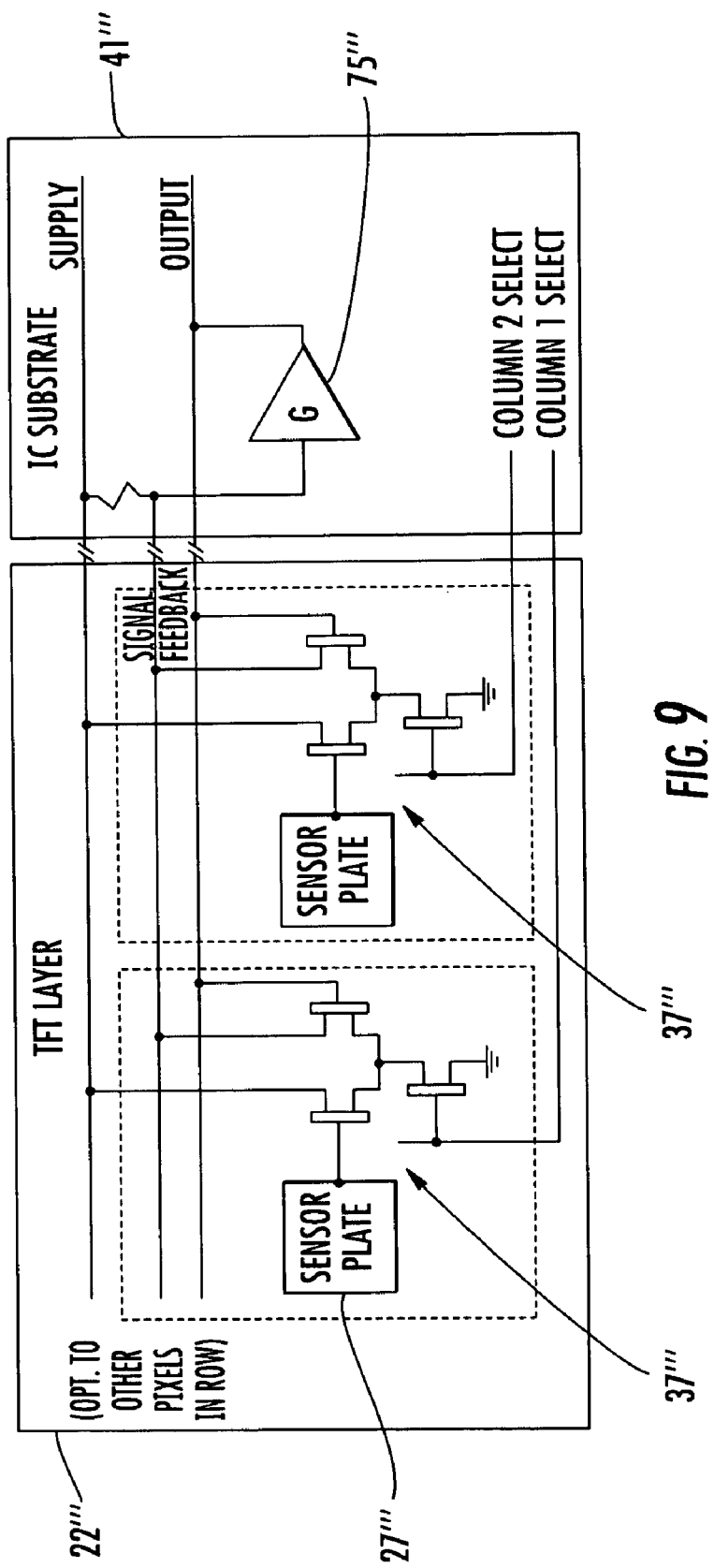

In accordance with another advantageous aspect, a split operational amplifier current sink may also be used to switch the bias current off and on in the differential TFT pair, effectively performing the switching function needed for time-based multiplexing, as illustrated in FIG. 9. Here, multiple sensing electrodes 27''' may be connected to the same signal and feedback busses, with only one differential pair activated at a time, such that current is only drawn through the signal lines by the one differential pair that is currently active.

Figure 10:
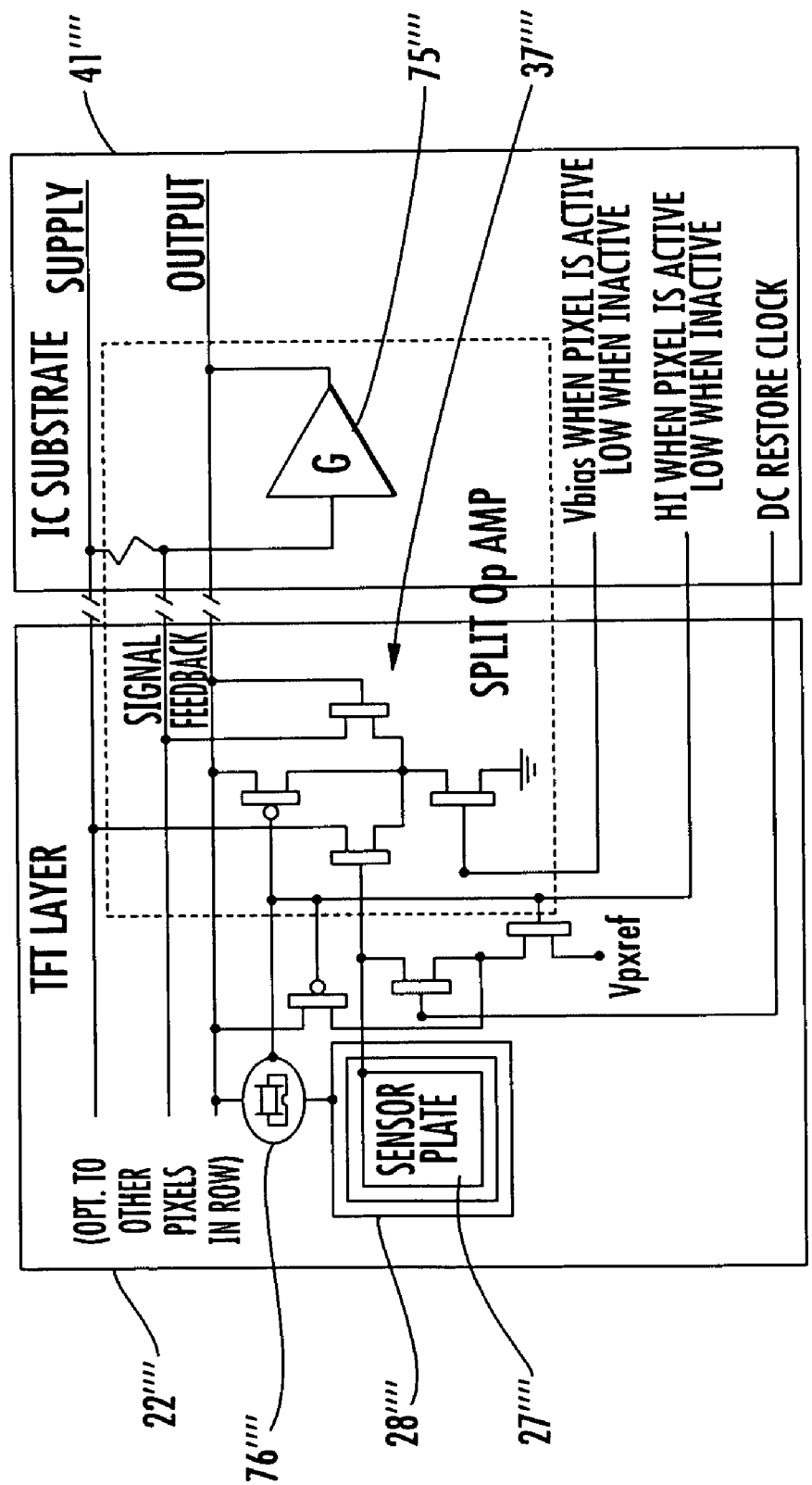

In some embodiments, if the shield electrode 28 drive is derived from the feedback lines, it may be desirable to disconnect the shield electrodes for inactive sensing electrodes 27 from the feedback lines to avoid overloading. A variety of different circuit configurations may be used for this purpose, one of which is illustrated in FIG. 10, in which a circuit element 76"" is used to selectively disconnect the shield electrode from its feedback line.

Two other kinds of performance enhancements that can be implemented are also shown in this illustrated example. One is a switched DC centering circuit that maintains extremely high input impedance to the sensor in spite of leaky switching transistors, and the second is a mechanism to minimize leakage current from the signal busses through inactive first stage transistors by reducing the voltage drop across those transistors to very nearly zero, as shown.

If the bussing of sensing electrode 27 signals is handled properly, it is possible to activate the sensing electrodes in the region surrounding the particular sensing electrode being measured. This may be done such that under pixel image processing can be performed by coupling the TFT amplifier stages 37 into impedance matrices, as described in U.S. Pat. No. 6,067,368, for example. Under pixel spatial filtering, which is also described in the '368 patent, may also be used to help normalize the array outputs, further compensating for variations in the semiconductor properties across a low cost platen array, as will be appreciated by those skilled in the art. Also, the dynamic range of the system may be adjusted by mechanisms such as those described in U.S. Pat. No. 6,259, 804 to provide the system with the ability to adapt to the wide variety of fingers and environments with which the sensors must operate. Each of the above-noted patents is hereby incorporated herein in its entirety by reference.

Surface coatings for low cost platen materials may vary depending on the specific substrate and fabrication process used. Glass-like coatings using thin layers of very hard materials (similar to the coatings used in monocrystalline silicon sensors) may potentially be used for glass substrate thin film structures. The thicker polymer coatings often used as a top surface for thin film devices, however, may significantly attenuate the electric fields in direct reading electronic sensors.

For flexible substrates using low temperature processing, such as plastic/organic semiconductor structures, thin layers of very hard materials may not be practical. These systems will preferably use flexible coatings. In both of the above-noted cases, composite materials having high electrical permittivity and/or anisotropic permittivity (such as described in U.S. Pat. No. 6,088,471, which is hereby incorporated herein in its entirety by reference) can be used effectively as protective coatings. These materials may consist of a polymer matrix with electrically active particles embedded therein. Relatively thick coatings of these materials have been demonstrated to be effective on monocrystalline silicon fingerprint sensors.

The finger biometric sensor 20 may also use a synchronous demodulation scheme or other phase sensitive decoding mechanism to translate the AC signals from the pixel sensors into an electronic representation of the ridge and valley structure. Phase distinction may be used to improve the imaging of sweaty fingers or fingers whose surface is contaminated, as will be appreciated by those skilled in the art. Measurements of the complex impedance of the finger skin may also be used to differentiate real fingers from artificial fake fingers, as described in U.S. Pat. No. 5,953,441, which is also included herein in its entirety by reference. Cryptographic functions such as described in U.S. Pat. No. 5,956,415, which is hereby included herein in its entirety by reference, may also be incorporated into the IC 39 to prevent security attacks on the sensor's external interface.

As noted above, there is some degree of similarity between the structure of the finger biometric sensor 20 and the structures common to TFT-based active matrix liquid crystal displays (LCDs). This similarity advantageously makes the fabrication of the overall sensor 20 compatible with existing display production facilities. Moreover, in some applications the structures of the finger biometric sensor 20 and an active matrix LCD may potentially be combined, as will also be appreciated by those skilled in the art.

The design techniques described above may be used to construct standard two-dimensional sensing arrays that are used for simple touch style finger presentations. Of course, it may also be applied to one-dimensional and "1½" dimensional sensing arrays, such as those used with a swiping finger motion during finger presentation. It should also be noted that the above-described finger biometric sensor may use different sensing arrays, such as capacitive sensing arrays, etc., in some embodiments, as will be appreciated by those skilled in the art. In addition, multi-biometric sensing arrays may also benefit by the techniques described herein, such as disclosed in MULTI-BIOMETRIC FINGER SENSOR USING DIFFERENT BIOMETRICS HAVING DIFFERENT SELECTIVITIES AND ASSOCIATED METHODS, U.S. patent application Ser. No. 10/935,704 filed Sep. 3, 2004, assigned to the present assignee, the entire contents of which are incorporated herein by reference.

Commercial users of flexible plastic identification (ID) cards (often referred to as "smart cards" when electronics are built into the card) have for many years desired to incorporate fingerprint sensors onto the cards themselves. This has typically not been practical in the past because sensors built on silicon or glass substrates are too rigid/brittle to tolerate the flexibility required of plastic ID cards. The techniques described above may allow the use of flexible substrates such as plastic/organic semiconductors to be used for the fingerprint platen, making incorporation of the fingerprint sensor into the flexible smart cards physically practical, as will be appreciated by those skilled in the art. Of course, the finger biometric sensor 20 may be used in numerous other types of devices, such as those described in the above-noted U.S. Pat. No. 5,963,679, for example.

Figure 11:
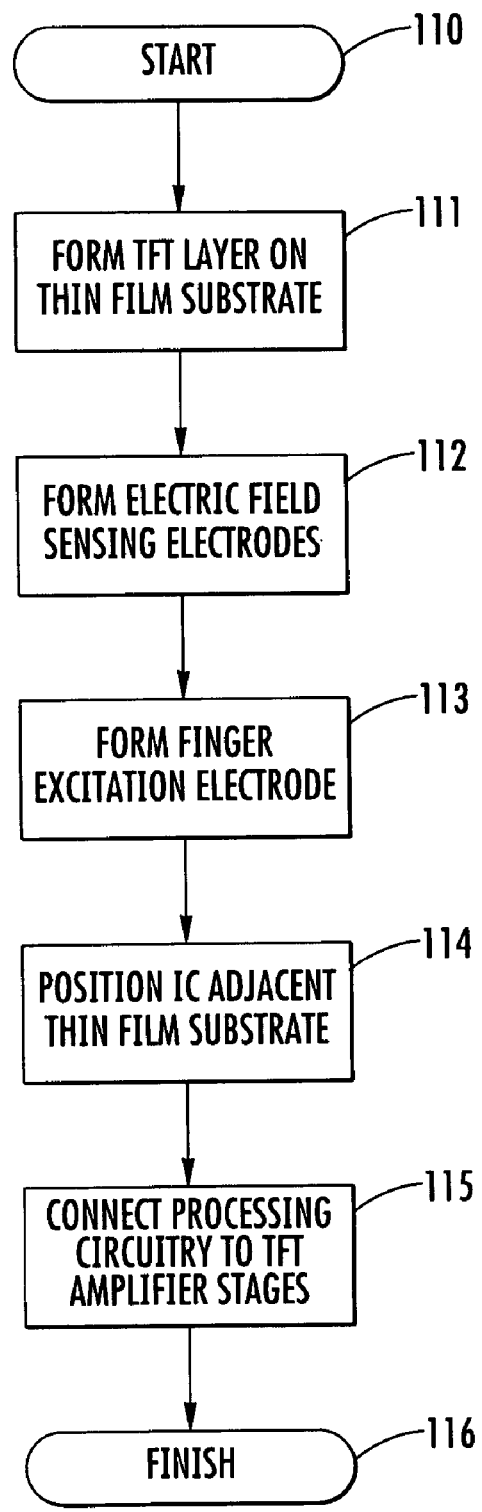
FIG. 11 is a schematic block diagram of a method for making a biometric sensor in accordance with the present invention.

A method aspect of the invention for making a finger biometric sensor 20 will now be described with reference to FIG. 11. The method begins (Block 110) with forming a TFT layer 22 on a thin film substrate 21, at Block 111, and forming an array of electric field sensing electrodes 27 adjacent the TFT layer for receiving a finger adjacent thereto, at Block 112. The TFT layer 22 may include a plurality of TFTs defining a respective TFT amplifier stage 37 for each electric field sensing electrode 27.

The method may further include forming a finger excitation electrode 38 adjacent the array of electric field sensing electrodes 27, at Block 113, and positioning at least one integrated circuit 39 adjacent the thin film substrate, at Block 114. The at least one integrated circuit 39 may include a monocrystalline substrate 41 and processing circuitry adjacent the monocrystalline substrate. In addition, the method may further include connecting the processing circuitry to the TFT amplifier stages 37, at Block 115, as discussed above, thus concluding the illustrated method (Block 116). Further method aspects of the invention will be appreciated based upon the foregoing discussion.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger biometric sensor comprising:
a thin film substrate;
a thin film transistor (TFT) layer on said thin film substrate;
an array of electric field sensing electrodes adjacent said TFT layer for receiving a finger adjacent thereto;
said TFT layer comprising a plurality of TFTs defining a respective TFT amplifier stage for each electric field sensing electrode;
a finger excitation electrode for applying an electric field to the finger; and
at least one integrated circuit adjacent said thin film substrate comprising
a monocrystalline substrate, and
processing circuitry adjacent said monocrystalline substrate and connected to said TFT amplifier stages.

2. The finger biometric sensor of claim 1 wherein said TFT layer further comprises a plurality of TFT switching circuits each connected between the output of a respective TFT amplifier stage and said processing circuitry; said at least one integrated circuit further comprising an addressing circuit adjacent said monocrystalline substrate for selectively operating said TFT switching circuits.

3. The finger biometric sensor of claim 2 wherein said addressing circuit selectively operates said TFT switching elements to provide time domain multiplexing.

4. The finger biometric sensor of claim 2 wherein said addressing circuit selectively operates said TFT switching elements to provide frequency domain multiplexing.

5. The finger biometric sensor of claim 2 wherein said TFT switching elements are arranged in rows and columns; and wherein said addressing circuit sequentially operates at least one of rows and columns of said TFT switching circuits.

6. The finger biometric sensor of claim 1 wherein each TFT amplifier stage comprises a differential TFT pair; and wherein said at least one integrated circuit further comprises a plurality of gain amplifier stages adjacent said monocrystalline substrate each connected between a respective TFT amplifier stage and said processing circuitry.

7. The finger biometric sensor of claim 6 wherein each gain amplifier stage is connected in a feedback loop to its respective TFT amplifier stage.

8. The finger biometric sensor of claim 1 wherein said at least one integrated circuit further comprises an excitation drive amplifier adjacent said monocrystalline substrate for driving said finger excitation electrode with an alternating current (AC) signal.

9. The finger biometric sensor of claim 1 wherein said at least one integrated circuit further comprises an addressing circuit for selectively operating said TFT amplifier stages.

10. The finger biometric sensor of claim 1 further comprising a respective shield electrode associated with each of said electric field sensing electrodes for shielding each electric field sensing electrode from adjacent field sensing electrodes.

11. The finger biometric sensor of claim 10 wherein each TFT amplifier stage drives said shield electrode for its respective electric field sensing electrode.

12. The finger biometric sensor of claim 1 wherein said processing circuitry comprises:
   a demodulator for demodulating signals from said TFT amplifier stages; and
   an analog-to-digital converter (ADC) downstream from said demodulator.

13. The finger biometric sensor of claim 1 wherein said array of electric field sensing electrodes generate finger biometric data based upon a sliding finger placement.

14. The finger biometric sensor of claim 1 wherein said array of electric field sensing electrodes generate finger biometric data based upon a stationary fingerprint placement.

15. A method for making a finger biometric sensor comprising:
   forming a thin film transistor (TFT) layer on a thin film substrate, the TFT layer comprising a plurality of TFTs defining a plurality of TFT amplifier stages;
   forming an array of electric field sensing electrodes adjacent the TFT layer for receiving a finger adjacent thereto, each electric field sensing electrodes being associated with a respective TFT amplifier stage;
   forming a finger excitation electrode for applying an electric field to the finger;
   positioning at least one integrated circuit adjacent the thin film substrate, the at least one integrated circuit comprising a monocrystalline substrate processing circuitry adjacent the monocrystalline substrate; and
   connecting the processing circuitry to the TFT amplifier stages.

16. The method of claim 15 wherein the TFT layer further comprises a plurality of TFT switching circuits each connected between the output of a respective TFT amplifier stage and the processing circuitry; and wherein the at least one integrated circuit further comprises an addressing circuit adjacent the monocrystalline substrate for selectively operating the TFT switching circuits.

17. The method of claim 16 wherein the addressing circuit selectively operates the TFT switching elements to provide time domain multiplexing.

18. The method of claim 16 wherein the addressing circuit selectively operates the TFT switching elements to provide frequency domain multiplexing.

19. The method of claim 16 wherein the TFT switching elements are arranged in rows and columns; and wherein the addressing circuit sequentially operates at least one of rows and columns of the TFT switching circuits.

20. The method of claim 15 wherein each TFT amplifier stage comprises a differential TFT pair; wherein the at least one integrated circuit further comprises a plurality of gain amplifier stages adjacent the monocrystalline substrate, and further comprising connecting each gain amplifier stage between a respective TFT amplifier stage and the processing circuitry.

21. The method of claim 20 wherein connecting each gain amplifier stage comprises connecting each gain amplifying stage connected in a feedback loop to its respective TFT amplifier stage.

22. The method of claim 15 wherein the at least one integrated circuit further comprises an excitation drive amplifier adjacent the monocrystalline substrate for driving the finger excitation electrode with an alternating current (AC) signal.

23. The method of claim 15 further comprising forming a respective shield electrode for shielding each electric field sensing electrode from adjacent field sensing electrodes.

24. The method of claim 15 wherein the array of electric field sensing electrodes are for generating finger biometric data based upon a sliding finger placement.

25. The method of claim 15 wherein the array of electric field sensing electrodes are for generating finger biometric data based upon a stationary fingerprint placement.

* * * * *

UNITED STATES PATENT AND TRADEMARK OFFICE
CERTIFICATE OF CORRECTION

| | |
|---|---|
| PATENT NO. | : 7,616,786 B2 |
| APPLICATION NO. | : 10/950195 |
| DATED | : November 10, 2009 |
| INVENTOR(S) | : Setlak |

It is certified that error appears in the above-identified patent and that said Letters Patent is hereby corrected as shown below:

Column 3, Line 7  Delete: "filed"
Insert: --field--

Column 3, Line 28  Delete: "is schematic"
Insert: --is a schematic--

Column 3, Line 32  Delete: "is schematic"
Insert: --is a schematic--

Column 4, Line 38  Delete: "The a finger"
Insert: --The finger--

Column 6, Line 17  Delete: "use a"
Insert: --use of a--

Column 7, Line 34  Delete: "form"
Insert: --from--

Signed and Sealed this

Twenty-eighth Day of September, 2010

David J. Kappos
*Director of the United States Patent and Trademark Office*